United States Patent Office 2,702,728
Patented Feb. 22, 1955

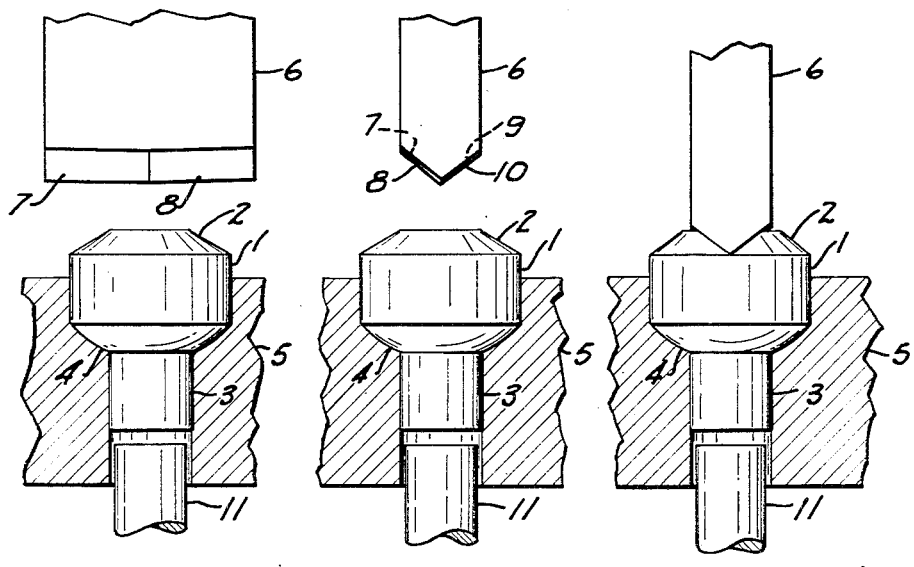

2,702,728

WEIGHING SCALE BEARING

Arthur E. Lindner and Arthur J. Burtscher, Toledo, Ohio, assignors to Toledo Scale Company, Toledo, Ohio, a corporation of New Jersey Application November 9, 1949, Serial No. 126,398

5 Claims. (Cl. 308—2)

This invention relates to weighing scale bearings and in particular to an improved V-bearing and process for making the bearing.

Most weighing scale pivotal connections consist of a pivot member mounted in the lever and having a sharpened edge, commonly called knife edge, resting in a valley or a V-groove formed in a bearing that is supported in a fulcrum stand or stirrup for applying force to the lever. It is extremely difficult and expensive to manufacture good V-groove bearings to receive the knife edges of the pivots. This follows because the material of the bearing, particularly in the valley, must be just as hard and tough as the material of the knife edge, it must be smooth particularly on the sides of the groove so that the knife edge will automatically seek the lowest point in the groove, and the valley in the groove must have a radius of curvature which for satisfactory operation must be held within quite close dimensional tolerance. In scales having long connections to the levers such that small changes in lengthwise positioning of the lever, or of the members pivotally connected to the lever, do not introduce error in load indication the radius of curvature at the bottom of the V of the bearing is made quite large, in the neighborhood of .01 inch or larger. In other bearings where relatively precise positional control of the lever must be maintained the radius of curvature of the groove may be limited to about .002 inch.

It is also necessary that the sloping sides of a bearing to either side of the valley be smooth so that a knife edge resting thereon can easily slide to the bottom of the groove.

It has been conventional practice to mill and grind or broach and grind the V-grooves for V-bearings. Either of these methods tends to leave minute tool marks parallel to the groove so that the sloping sides of the V-groove are not really smooth but rather are ridged and rough. In addition, these methods of manufacture do not lend themselves to precise control of the radius of curvature of the valley of the V-groove. This follows because it is difficult to maintain on the grinding wheel a sharp edge having the required small radius of curvature.

The principal object of this invention is to provide a V-groove bearing the sides of which are extremely smooth and completely free of tool marks parallel to the V-groove and the bottom of the groove of which has an accurately controlled radius of curvature.

Another object of the invention is to provide an improved method of manufacturing the improved bearing.

A still further object of the invention is to modify the shape of the original V-groove bearing blanks so that subsequent distortion in heat treatment precisely produces the required shape of bearing.

More specific objects and advantages are aparent from the following description of several forms of improved V-bearings and a preferred method of manufacturing the bearings.

According to the invention the improved bearing is manufactured by pressing a V-groove into the end of a prepared bearing blank and subsequently hardening the blank to the desired surface hardness. The invention further contemplates preliminary shaping of the blank to reduce the force required in pressing the blank and in the amount of flow of material of the blank as it is being pressed.

Specific embodiments of the invention are illustrated in the accompanying drawings.

In the drawings:

Figure I is a front elevation partly in section of a bearing blank, a support, and a punch ready to press the bearing blank to form the V-groove therein.

Figure II is a side elevation of the bearing, bearing blank and punch.

Figure III is similar to Figure II except that the punch has been driven into the bearing blank to form the V-groove therein.

Figure IV is a plan view of one form of bearing.

Figure V is a side elevation of the bearing shown in Figure IV.

Figures VI and VII are, respectively, a plan and a side elevation of another form of bearing.

Figures VIII and IX are, respectively, a plan and a side elevation of still another form of bearing.

Figure X is a side elevation of a still further form of bearing.

These specific drawings and the accompanying description are intended merely to illustrate the invention but not to limit its scope.

In the manufacture of the improved bearings a bearing blank having a cylindrical portion 1, a truncated generally conical or tapered upper portion 2, a tenon 3, and a spherical seat portion 4 is held in a socket in a die plate 5 while a punch 6 is driven downwardly to split the generally conical portion 2 of the blank as it forms a V-groove in such portion. The end of the punch 6 is pointed as seen from front or side. From the front the point is scarcely discernible while from the side, the point corresponds to the V-groove to be produced. The bottom end of the punch 6 thus comprises four flat areas 7, 8, 9 and 10. When the punch reaches its lowermost position as shown in Figure III the leading edge of the punch has cut through the truncated conical portion 2 of the bearing blank and has just reached the upper limit of the cylindrical body portion 1 of the blank. This position is illustrated in Figure III. After the punch is lifted following a pressing operation an ejector 11 operating through the bottom of the die plate 5 ejects the pressed bearing from the die plate.

In this method of manufacture the surfaces 7, 8, 9 and 10 of the punch 6 are made of an extremely hard, tough material such as the steel employed in the hobbing dies used in manufacturing molds for the plastics molding industry. The surfaces are highly polished so as to be extremely smooth and free from tool marks of any kind. The dihedral angle between the faces 8 and 9 or 7 and 10 as viewed in Figure II is approximately the same as the included angle of the V-groove to be formed in the finished bearing. This angle may vary from 105 to 150°. In the bearings shown in the drawings it varies from 105 to 120°. This covers the usual range of angles required in most weighing scale constructions.

The dihedral angle between the faces 7 and 8 or 9 and 10 of the punch is very shallow being almost 180°. This slight convexity is required however to compensate for the elasticity of the metal of the bearing blank and the growth of the metal during the hardening operation. The springback or elastic recovery and the growth in hardening occur chiefly in the central portion of the blank and leave the V-groove with a straight valley having neither crown nor dip. If the punch 6 is merely chisel-shaped (the bottom being straight from side to side with no crown or convexity) the resulting completed and hardened bearings are found to have a crown of several thousandths of an inch in the groove of the bearing. In other words the bottom of the V-groove is not straight across the bearing but rather is high in the middle so that when a straight knife edge is placed in the V-groove it bears on the center section only.

One of the major problems in the manufacture of the improved V-bearing is the control of the flow of the metal of the blank during the pressing operation. To secure adequate flow without requiring excessive pressures the blank is shaped to reduce the amount of metal that must be distorted or moved. Thus the blank shown in Figures I to V has a truncated conical upper portion. This particular shape materially reduces the quantity of metal that must be moved by the punch. Thus when the punch first touches the blank the line of action is across the diameter of the smaller base of the truncated conical section and this base is split into two parts that are pushed aside as the punch enters the blank. This is the preferred shape if the bearing is to have a groove with an included angle of around 105 to 110°.

Figures VI and VII show another form in which not only is the upper portion of the blank a truncated cone but also cuts are taken across each side parallel to the intended V so as to leave a central section 12 that is split and bent apart to the shape shown in Figure VII as the punch enters the upstanding center section of the blank. This particular form materially reduces the work required in forming the V-groove but it is somewhat more expensive because of the additional operation of cutting the sides of the conical portion prior to the pressing operation.

It is also possible to reduce the amount of metal that must flow during the punching operation by first milling or broaching a groove such as the groove 13 indicated by the dotted lines of Figure IX. After this groove is milled across the flat circular top of the bearing blank the blank is put in the press with the groove 13 aligned with the punch and the punch is then driven into the blank to make the final, finished groove 14. Since most of the metal was removed in cutting the groove 13 the subsequent punching operation increased the depth of the groove 14 principally by densifying the material of the blank and secondarily by causing a small amount of flow toward the sides of the blank.

If a shallower V-groove, one having a larger included angle between its sides, is to be formed in a blank it is preferable, in order to secure proper flow characteristics of the metal, to form the upper portion of the blank as a section of an oblate ellipsoid such as the section 15 of Figure X. In such a section as the punch descends, the slightly greater amount of metal that is moved during the first portion of the stroke provides support for and increases the flow of the metal in underlying portions of the section so that the increased flow is accomplished without producing checks in the sides of the V-groove 16 in the finished piece.

Except for the difference in the tapering or shaping of the upper section of the blank the method of operation and the production of the final V-groove is the same for all of the bearings illustrated. Thus the only difference between the various examples is in the preliminary form of the blank that is employed to get the desired flow characteristics of the metal. Thus the upper portion of the blank may be a truncated cone as shown in Figures I to V, it may be a truncated cone with side sections cut away as shown in Figures VI and VII, it may be flat-topped cylindrical with a milled or broached preliminary groove as shown in Figures VIII and IX or it may be generally spherical or ellipsoidal with a small flat top as shown in Figure X. In addition to these, other modifications of form generally approximating the illustrating forms may be used with little difference in result.

In the manufacture of the improved bearings the blanks are first machined to shape, then pressed in a punch, and then heat treated to provide the desired surface hardness. There are no smoothing or grinding operations on the punched or swaged grooves since the fine polished surfaces of the punch 6 leave equally smooth surfaces in the V-bearing blank and the smoothness of these surfaces is not lost during the hardening of the blank. The radius of curvature of the valley of the V-groove is controlled in this method of manufacture by merely rounding the edge between the surfaces 8, 9 and 7, 10 to the desired curvature. Since the rounding operation is performed on an external edge it may be easily and accurately accomplished. This edge is not subjected to lateral forces during a punching operation and, therefore, holds its shape with remarkable fidelity through thousands of punching operations.

Each bearing blank is proportioned so that the bottom of the V-groove formed therein passes through the center of curvature of the spherical seating surface 4. Therefore, when the finished bearing is installed in a scale, it may rock slightly in either direction to secure even bearing pressure of the supported knife edge throughout the length of the groove.

These improved bearings are characterized by the extremely smooth surfaces of the groove and the sides of the valley of the V-groove and by the total absence of any tool marks extending parallel to the groove. While it is possible for hard particles of material to lodge on the punch and possibly cut furrows in the sides of the V-groove in the bearing these furrows cause no trouble because they are perpendicular to the knife edge and thus do not afford any interruption in the smooth surface in which the knife edge may catch.

The superior finish on the sides of the improved V-bearing as well as the superior finish in the valley of the groove itself practically eliminates any tendency for the knife edge of the pivot to ride up onto the sides of the V-groove and fail to center itself exactly in the bottom of the valley. This improved surface finish in combination with the accurately controlled radius of curvature at the bottom of the V makes it much easier to control the relative position of a lever and the other parts cooperating therewith without introducing any possibility for frictional forces to develop as occur when a slightly blunted knife edge rests in the valley of a sharp V where it must turn as a shaft in a journal rather than as a wheel or cylinder on a relatively flat surface.

Various modifications may be made in the specific shape of the bearing blank and in the shape of the face of the punch without departing from the spirit and scope of the invention.

We claim:

1. A V-bearing for a weighing scale comprising a member of hardened bearing steel, a tapered end on the member, said member having a V-groove extending across the tapered end which groove is defined by generally flat sides and a concave bottom of smooth surface and high density.

2. A metallic weighing scale bearing having a V-shaped groove with its sides swaged and polished in a direction toward its apex, there being an accurately dimensioned curved trough pressed into the metal at the apex of the groove, the sides of the groove being tangential to the curve of the trough and the metal surfaces of the groove and the trough being pressed into enhanced density.

3. A steel weighing scale bearing having a V-shaped groove with its sides swaged and polished in a direction toward its apex, there being an accurately dimensioned curved trough pressed into the steel at the apex of the groove, the sides of the groove being tangential to the curve of the trough, the steel surfaces of the groove and the trough being pressed into enhanced density, the steel surfaces of the groove and the trough being heat hardened and the trough being heat straightened.

4. A metallic weighing scale bearing having a frusto-conical portion and a V-shaped groove in said frusto-conical portion with its sides swaged and polished in a direction towards its apex, there being an accurately dimensioned curved trough pressed into the metal at the apex of the groove, the sides of the groove being tangential to the curve of the trough and the metal surfaces of the groove and the trough being pressed into enhanced density.

5. A steel weighing scale bearing having a tapered portion and a groove in the tapered portion with its sides swaged and polished in a direction toward its apex, there being an accurately dimensioned curved trough pressed into the steel at the apex of the groove, the sides of the groove being tangential to the curve of the trough, the steel surfaces of the groove and the trough being pressed into enhanced density, the steel surfaces of the groove and the trough being heat hardened and the trough being heat straightened.

References Cited in the file of this patent

UNITED STATES PATENTS

| Number | Name | Date |
|---|---|---|
| 606,529 | Finn | June 28, 1898 |
| 1,806,179 | Reeves | May 19, 1931 |
| 1,925,721 | Johnston | Sept. 5, 1933 |
| 2,080,750 | Thompson | May 18, 1937 |
| 2,125,272 | Erdman | Aug. 2, 1938 |
| 2,130,854 | Murphy | Sept. 20, 1938 |
| 2,182,092 | O'Leary | Dec. 5, 1939 |
| 2,213,040 | Drissner | Aug. 27, 1940 |
| 2,219,067 | Colomb | Oct. 22, 1940 |
| 2,229,565 | Hallowell | Jan. 21, 1941 |
| 2,294,802 | Reich | Sept. 1, 1942 |
| 2,350,321 | Bennett | June 6, 1944 |
| 2,462,851 | Fawcett et al. | Mar. 1, 1949 |